United States Patent
Campbell

(10) Patent No.: US 10,940,969 B2
(45) Date of Patent: Mar. 9, 2021

(54) BAND SAW BLADE SPOOLING MACHINE AND METHOD OF USING IT

(71) Applicant: EDGE MANUFACTURING, INC., Pevely, MO (US)

(72) Inventor: James P. Campbell, De Soto, MO (US)

(73) Assignee: EDGE MANUFACTURING, INC., Pevely, MO (US)

(*) Notice: Subject to any disclaimer, the term of this patent is extended or adjusted under 35 U.S.C. 154(b) by 0 days.

(21) Appl. No.: 16/498,967

(22) PCT Filed: Mar. 13, 2018

(86) PCT No.: PCT/US2018/022205
§ 371 (c)(1),
(2) Date: Sep. 27, 2019

(87) PCT Pub. No.: WO2018/190981
PCT Pub. Date: Oct. 18, 2018

(65) Prior Publication Data
US 2020/0377329 A1    Dec. 3, 2020

Related U.S. Application Data

(60) Provisional application No. 62/483,650, filed on Apr. 10, 2017.

(51) Int. Cl.
*B65B 63/04*        (2006.01)
*B65H 54/58*        (2006.01)

(52) U.S. Cl.
CPC .......... *B65B 63/04* (2013.01); *B65H 54/585* (2013.01)

(58) Field of Classification Search
CPC .............................. B65B 63/04; B65H 54/585
See application file for complete search history.

(56) References Cited

U.S. PATENT DOCUMENTS

| 2,501,201 A | 3/1950 | Wilcox |
| 2,723,087 A | 11/1955 | Simmons |
| 6,561,351 B1 | 5/2003 | Wright |

FOREIGN PATENT DOCUMENTS

WO    20120156829 A1    11/2012

OTHER PUBLICATIONS

International Search Report for PCT/FR2018/022205 dated Jun. 6, 2018.
Written Opinion for PCT/FR2018/022205 dated Jun. 6, 2018.

*Primary Examiner* — William E Dondero
(74) *Attorney, Agent, or Firm* — Sandberg Phoenix & von Gontard, P.C.

(57) ABSTRACT

A band spooling machine (1) including a small arbor (19) with protrusions (21) that rotate with the arbor. In an embodiment, the machine includes a table (3) having side rails (7) and a single rotating arbor (19) carrying two spaced-apart pins (21) having blocks (23) that rotate freely on the pins. The arbor is preferably mounted close to one end of the machine and substantially closer to one of the side rails than to the other. The blocks prevent the blade from kinking. The machine forms the band into a pretzel having a circle part (C) divided by a central reach (R) into two lobes, and a teardrop shaped tail (T).

12 Claims, 6 Drawing Sheets

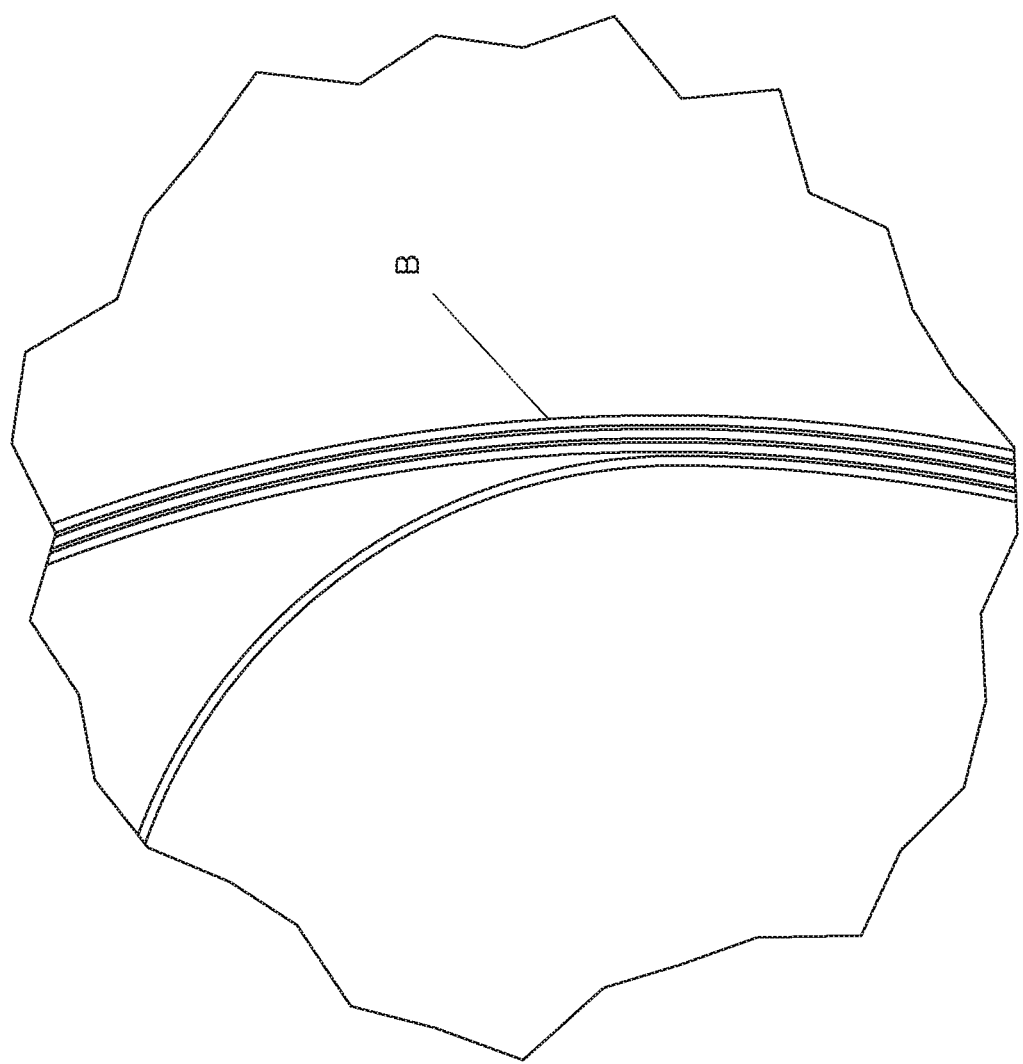

BAND SAW BLADE SPOOLING MACHINE AND METHOD OF USING IT

CROSS-REFERENCE TO RELATED APPLICATIONS

This application claims the benefit of U.S. Provisional Patent Application No. 62/483,650, filed Apr. 10, 2017, the disclosure of which is hereby incorporated by reference.

STATEMENT REGARDING FEDERALLY SPONSORED RESEARCH

Not Applicable.

BACKGROUND OF THE INVENTION

This invention relates to a machine and method for spooling bands of material. It has particular usefulness in spooling large band saw blades, and the invention will be described with respect to band saw blades. In its broader aspects, however, the invention may be used to spool any band of material having a height greater than its thickness and a length many times greater than its thickness.

Shipping band saw blades can be very expensive because they take up a lot of space but do not weigh very much. With many shipping companies charging for a standard weight of a package of a given size, it is very beneficial to pack band saw blades in the smallest space possible in order to reduce shipping costs. The same problem may exist for other bands of thin material.

Spooling the blade into a compact shape is a common practice to reduce the package size of a band saw blade. Spooling is done by setting the band saw blade on a flat table with a mechanism to spool the blade up into a shape consisting of a generally circular portion, having a central reach dividing the circle into yin and yang lobes, and a teardrop-shaped tail lobe. The circular portion will consist of different numbers of layers, depending on the length of the blade. The segment lobes and tail lobe all have a major radius which is large enough to prevent creating a permanent bend or kink in the blade. Such a shape is sometimes referred to as a "pretzel" or "kidney." The term pretzel is used herein to indicate this general shape.

Devices have long been in use for spooling smaller band saw blades. As disclosed in more detail in Provisional Application No. 62/483,650, one is manufactured by Edge Manufacturing, Inc., Pevely, Mo., the assignee of the present application. In this machine, a slotted spindle receives a blade. Fences in the form of side walls retain the blade on the table. As the spindle turns, the blade is constrained by shoulder blocks and side walls until it is formed into a pretzel. Ties are then wrapped through openings in the table and around contiguous reaches of the blade to hold its shape while it is packaged in a flat corrugated board box, of the general shape of a pizza box. One such box is shown in Wright, U.S. Pat. No. 6,561,351. This machine, however, is not suitable for larger blades.

One area of concern when spooling the blade is to avoid kinking the blade so that it has a permanent bend in it. Care must be taken when designing the spooling mechanism such that the bend radii during spooling are large enough not to kink the material. This becomes especially troublesome on large blades where the bend radius needs to be 6" or above. For band saw blades that are very thick, the round portion of the spooled band saw blade will get very large. The arbor will be very expensive if it is made the size of the round portion of the spooled band saw blade. The machine becomes quite costly and large when the spooling mechanism is the size of the radius required on the blade.

As disclosed in more detail in Provisional Application No. 62/483,650, one such band saw folding machine is manufactured by Gulf States Saw & Machinery Co., Inc., Hueytown, Ala. This device includes three discs sized to conform to the radii of the three lobes of the finished pretzel. The discs are arranged symmetrically on a table between specially shaped guide walls. A band saw blade band is placed between the discs and constrained by side walls. The discs are then rotated around an axis between them until the band is spooled into a pretzel. Ties are then wrapped around points where portions of the blade overlap. The machine is capable of spooling larger band saw blades into pretzels, but the machine is large and complex and is designed solely to create pretzels of a single predetermined size.

BRIEF SUMMARY OF THE INVENTION

In accordance with the present invention, a band saw spooling machine is provided which includes a simple mechanism for spooling larger band saw blades that keeps the size and cost of the spooling mechanism down. It also makes possible such a machine that permits spooling different size blades.

The machine of the invention includes a small arbor with blocks that rotate on the arbor. The preferred machine includes a table having side rails or fences and a single rotating arbor carrying two spaced-apart protrusions. The arbor is preferably mounted close to one end of the machine and substantially closer to one of the side rails than to the other. The protrusions are preferably in the form of pins mounted generally diametrically opposed near the periphery of the arbor. Illustratively, the pins are in the form of shoulder bolts. Preferably, the pins carry freely rotatable blocks which prevent the blade from kinking, each block being rotatably mounted on a pin near an end of the block, preferably with a curved face engaging the blade. The diameter of the arbor, hence the spacing of the protrusions, is less than a diameter of the circular portion of the spooled blade in the final pretzel; usually, the protrusions are spaced 0.2 to 0.4 times the diameter of the circular portion of the spooled band, preferably one-third to one-quarter the diameter of the circular portion of the spooled band. The protrusions are illustratively mounted between three and six inches apart; their exact spacing may be adjusted in accordance with the size of the pretzel to be formed.

BRIEF DESCRIPTION OF THE SEVERAL VIEWS OF THE DRAWINGS

In the accompanying drawings which form part of the specification:

FIG. 6 is a fragmentary view of a spooled band, taken at 6-6 of FIG. 4.

DESCRIPTION OF THE PREFERRED EMBODIMENT

Figure 1:
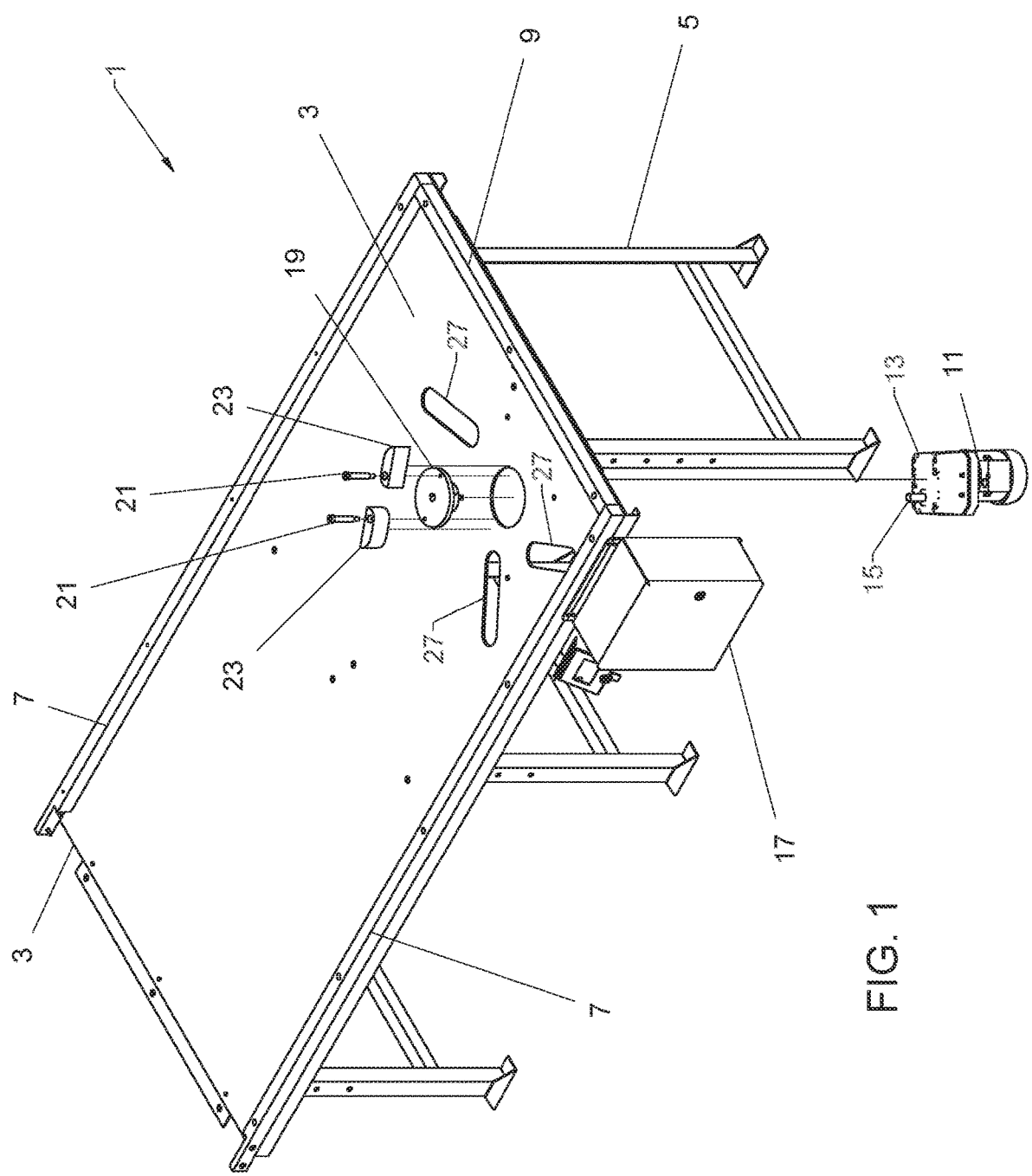
FIG. 1 is an exploded view in perspective of one embodiment of a spooling machine in accordance with the present invention.

An illustrative embodiment 1 of the machine of the present invention is shown in FIGS. 1-6.

The band saw blade spooling machine 1 includes a flat table 3 with support legs 5. The table includes straight containment side rails 7 and a straight top rail 9 around its edge to keep the blade from sliding off during the spooling process. The foot of the table, in this illustrative embodiment, lacks a rail, to allow longer blades to extend over the edge before spooling. The table 3, between the rails 7, is illustratively about 48" wide, and has a length of about 180". The size and shape of the table will be determined by the size of the band that needs to be spooled and the size of the pretzel to be formed. Mere repositioning of the rails 7 and/or 9 will allow considerable variation in the length of the blade which may be spooled and in the size of the pretzel formed by the same machine.

A motor 11 is mounted underneath the table 3. The motor 11 includes a gearbox 13 which reduces the speed of the motor 11. The motor 11 is illustratively a single-speed AC motor using a 138:1 gearbox. It will be understood that other ratios and other motors, including variable speed DC motors for example, may be used. The motor is controlled by a standard control box 17.

Connected to the shaft 15 of the motor 11 is an arbor 19. The arbor 19 is flush with the top of the table 3. It illustratively has a diameter of about 6", far smaller than the diameter of the lobes of the pretzel to be formed on the machine. The center of rotation of the arbor is spaced about 14" from the top rail 9, about 11.5" from the closer side rail 7, much closer than the distance from the farther side rail 7. This allows more working space and the ability to put a longer blade on the table to spool and still keep the size of the spooled blade small. The exact position can be modified to meet the needs of the user.

Figure 5:
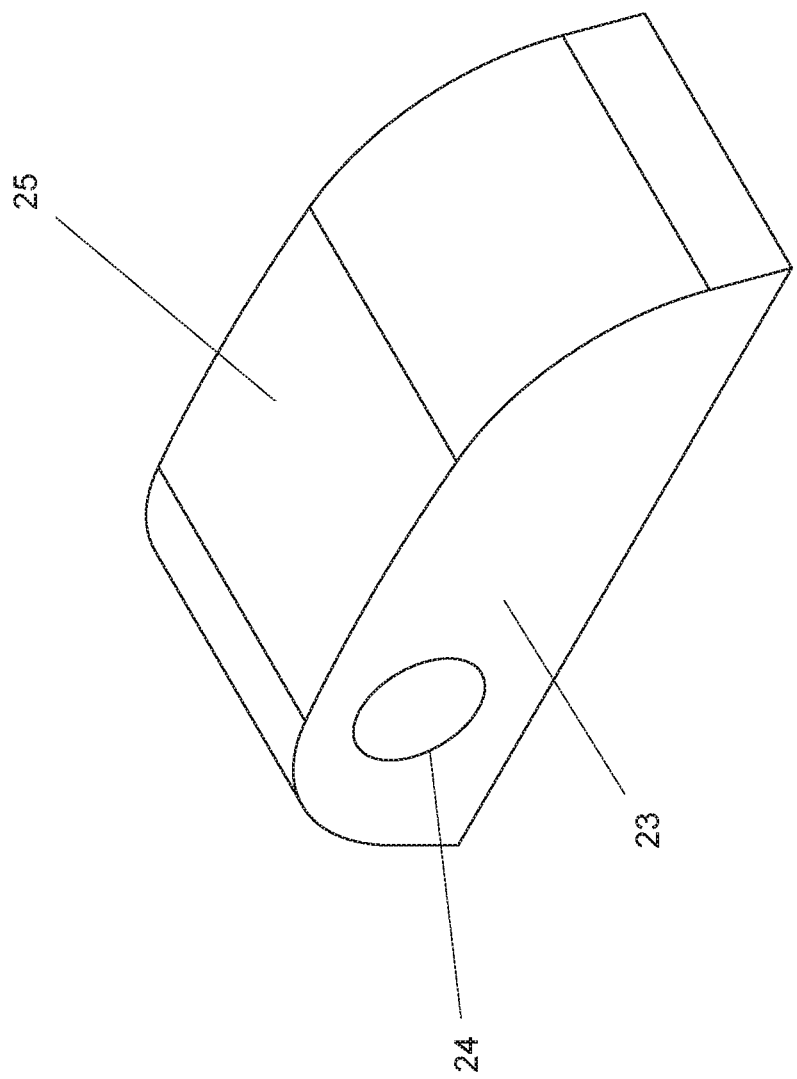
FIG. 5 is a view in perspective of a one of two identical rotatable block parts of FIGS. 1-4.

Mounted on the arbor 19, near its periphery, are two shoulder bolts 21 on which identical blocks 23 are rotatably mounted. The shoulder bolts are illustratively spaced 5" from each other, center to center. The blocks 23 are illustratively over 4" long and about 1.5" wide. As shown in FIG. 5, each block 23 includes a through-hole 24 about 1" from one end, and each has a curved face 25 designed to contact the band B during the entire process of spooling the band B.

The blocks 23 are designed with a large radius on the part 25 that touches the band saw blade B. This allows the blocks to rotate to an equilibrium position while spooling the blade and the large radius on the blocks prevents any kinking of the band saw blade. The block face 25 is a blend of three different radii with a lead-in radius and lead-out radius, while the main radius is very large. The face 25 does not exactly match the curve of the band as the natural curve will change with the width and thickness of the material. The band cannot bend any tighter than the radius established by the size and shape of the face 25.

The ability of blocks 23 to spin freely and the shape of their curved faces prevent kinking or putting a permanent bend in the band while the band is being spooled. The mechanism must have a gap between the two blocks 23 that will contact the blade when spooling.

Figure 2:
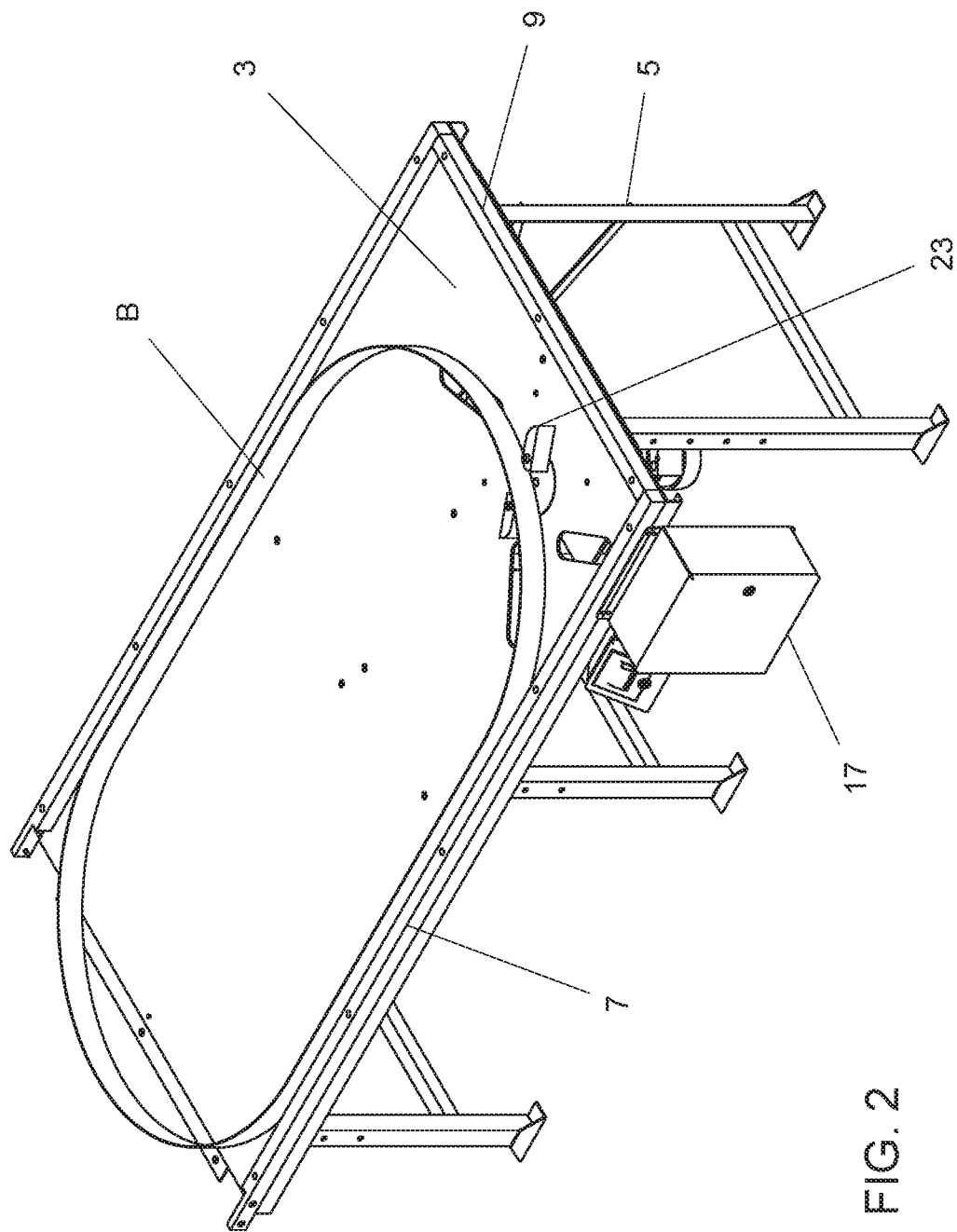
FIG. 2 is a view in perspective of the machine of FIG. 1, showing a blade positioned on a table of the machine, ready to be spooled into a pretzel by the machine.
Figure 3:
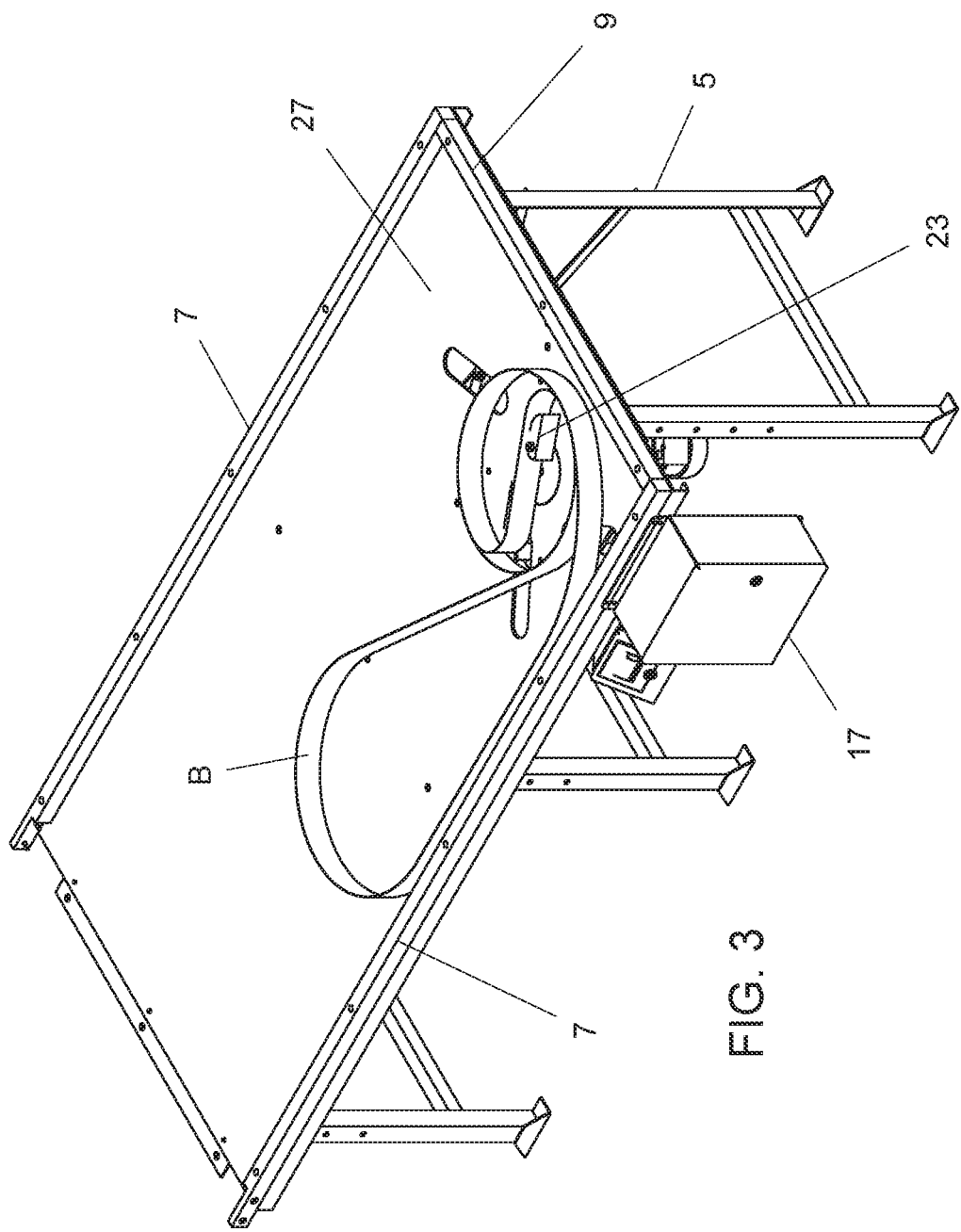
FIG. 3 is a view in perspective of the machine of FIGS. 1 and 2, showing the blade in the process of being formed into a pretzel by the machine.
Figure 4:
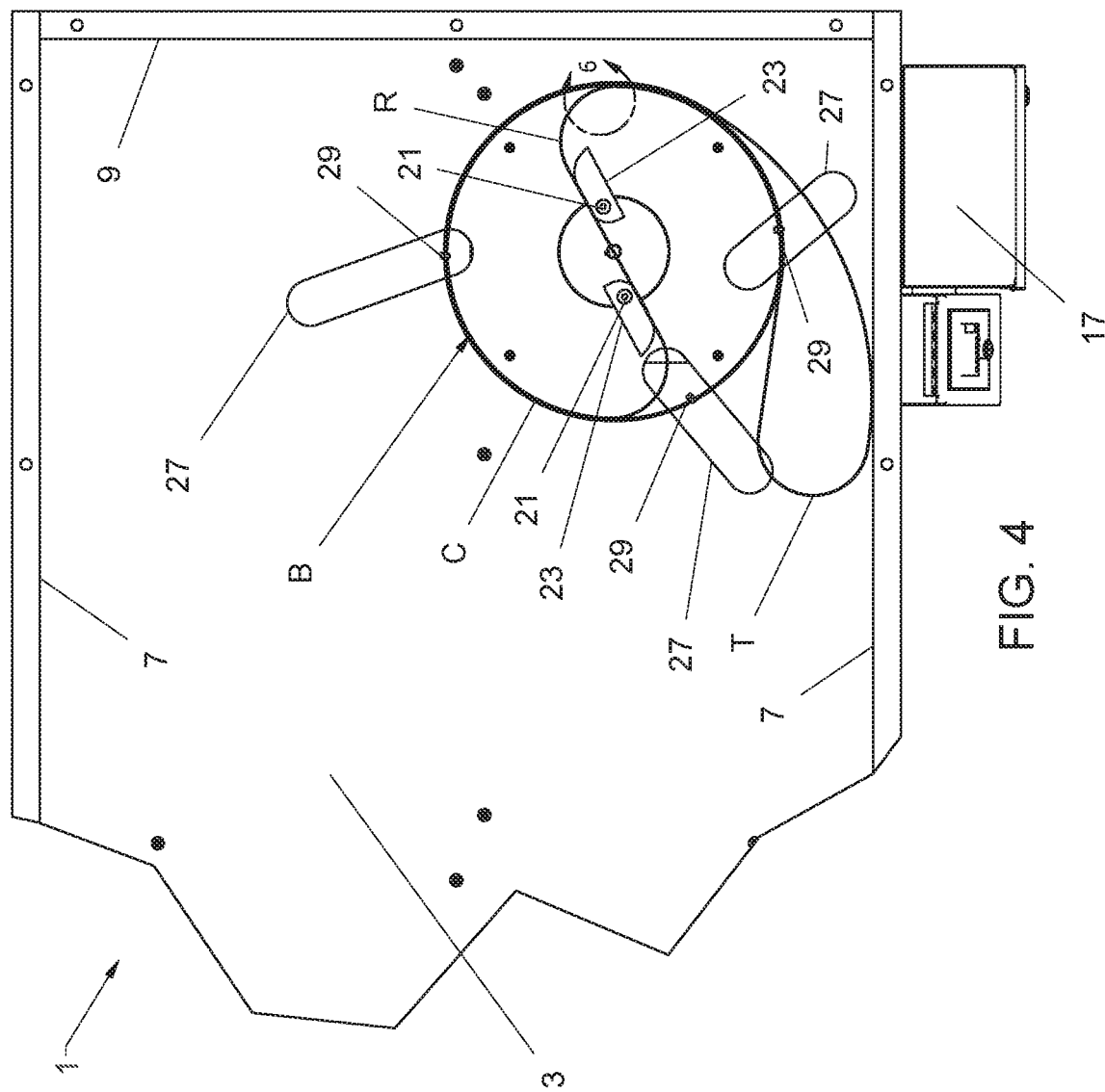
FIG. 4 is a top plan view of the machine of FIGS. 1-3, partially broken away, showing the blade formed into a pretzel by the machine, with ties applied through openings in the table of the machine.

To start the spooling process the blade is placed in the gap between the two blocks 23 as shown in FIG. 2. The motor is then turned on, the arbor rotates counterclockwise, and the blade starts spooling as shown in FIG. 3. The majority of the blade will be spooled into a circle C having a central reach R extending between the blocks 23 and dividing the circle into yin and yang lobes, with the final portion of the blade B forming a teardrop-shaped tail T off the side of the circle C. As shown in FIG. 6, the circle C will typically comprise multiple layers of the blade B. The amount of spooling is dependent on the length of the blade. This may either be controlled manually by the operator or automatically by counting the turns of the motor arbor or sensing the length of the teardrop portion. Once the blade has been spooled to the proper size, as shown in FIG. 4, the motor stops and the operator ties the blade with ties 29 in two or three places, through slots 27 in the table, so the blade B will hold its shape once unloaded from the spooling table 3. After the blade has been tied as indicated at 29 in FIG. 4, the motor 11 is reversed for a small rotational distance to relieve the tension from the blade to make it easier to unload. After unloading, the arbor is returned to the loading position to prepare the machine 1 for the next blade.

It will be seen that the illustrative embodiment of the machine is capable of spooling bands of different lengths into the same size pretzel, for packaging in a standard box.

Numerous variations in the machine of the present invention, within the scope of the appended claims, will occur to those skilled in the art in light of the foregoing disclosure. Merely by way of example, to form larger or smaller pretzels having larger or smaller radii of curvature, the side and end rails (fences) may be made moveable and moved outward or inward to accommodate the size of the finished pretzel. The shapes of the blocks and the radius of curvature of their engaging faces may be varied to accommodate different size pretzels. The positioning of the arbor with respect to the rails may be varied to meet the user's needs. The size and shape of the rotatable blocks may be varied somewhat, although the blocks should be shaped to contact the band at two points throughout the spooling process, and preferably shaped to conform to the curvature of the central reach of the final, minimum circular shape of the band. The size of the pretzel may be varied by moving the fence (rail) closest to the axis of rotation of the arbor. A larger pretzel may be formed by the simple expedient of reversing the direction of rotation of the arbor.

The motor may be of different types and may be rotated in either direction. It will be seen that merely reversing the direction of rotation will cause the flat sides of the blocks to contact the blade; it has been found that this conformation is capable of spooling the blade without kinking, but it is preferred to shape the blocks to conform generally to the shape of the hoop portion of the spooled blade, rather than contacting it solely at two points. This may be achieved by the use of different blocks, by inverting the illustrative blocks, or by forming the blocks to be curved on both sides.

The blocks may be fabricated in numerous ways, for instance they need not be solid, and they may be made of any suitable material. Their configuration may be changed to fit a particular hoop size more precisely or less so.

These variations are merely illustrative.

The invention claimed is:

1. A band spooling machine (1) for forming a band (B) into a pretzel having a circle part (C), the circle part being divided by a central reach (R) into two lobes, and a teardrop shaped tail (T), the machine comprising a support table (3) having at least two side rails (7), a rotatable arbor (19) in the table, and two blocks (23) rotatably mounted on the arbor, the blocks being moveable to a position leaving a gap between the blocks for insertion of a band (B).

2. The machine of claim 1 wherein the blocks have curved faces shaped to engage the band.

3. The machine of claim 1 wherein the blocks are rotatable about axes which are spaced apart a distance less than a smallest radius of curvature of the pretzel.

4. The machine of claim 1 wherein the arbor rotates around an axis substantially closer to one side rail than to the other.

5. The machine of claim 1 wherein the side rails are generally parallel and further including a top rail generally perpendicular to the side rails.

6. The machine of claim 5 wherein the rails are all straight, the table being free of other blade-constraining peripheral barricades.

7. The machine of claim 1 wherein the band is a band saw blade.

8. A method of spooling a band (B) comprising placing the band on a table (3) having constraining fences (7,9), positioning a portion of the band between two freely rotatable blocks (23) mounted on a rotatable arbor (19), and rotating the arbor, while restraining movement of the band between said fences, until the band is formed into a pretzel having a circle part (C) divided by a central reach (R) into two lobes, and a teardrop shaped tail (T).

9. The method of claim 8 wherein the fences include two side rails (7) and wherein the table further includes a top rail (9), at least one of the rails constraining outward movement of the band during spooling.

10. The method of claim 8 wherein the arbor rotates about an axis substantially closer to one side rail than to the other.

11. The method of claim 8 wherein the band is a band saw blade.

12. A band spooling machine (1) for forming a band (B) into a pretzel having a circle part (C), the circle part being divided by a central reach (R) into two lobes, and a teardrop shaped tail (T), the machine comprising a support table (3) having at least two side fences (7), an arbor (19) in the table, the arbor being rotatable around an axis, the arbor comprising two protrusions (21) spaced apart a distance to accept at least one reach of the band between the protrusions, characterized in that the axis of the arbor is closer to one of said side fences than to the other.

* * * * *